Patented June 20, 1939

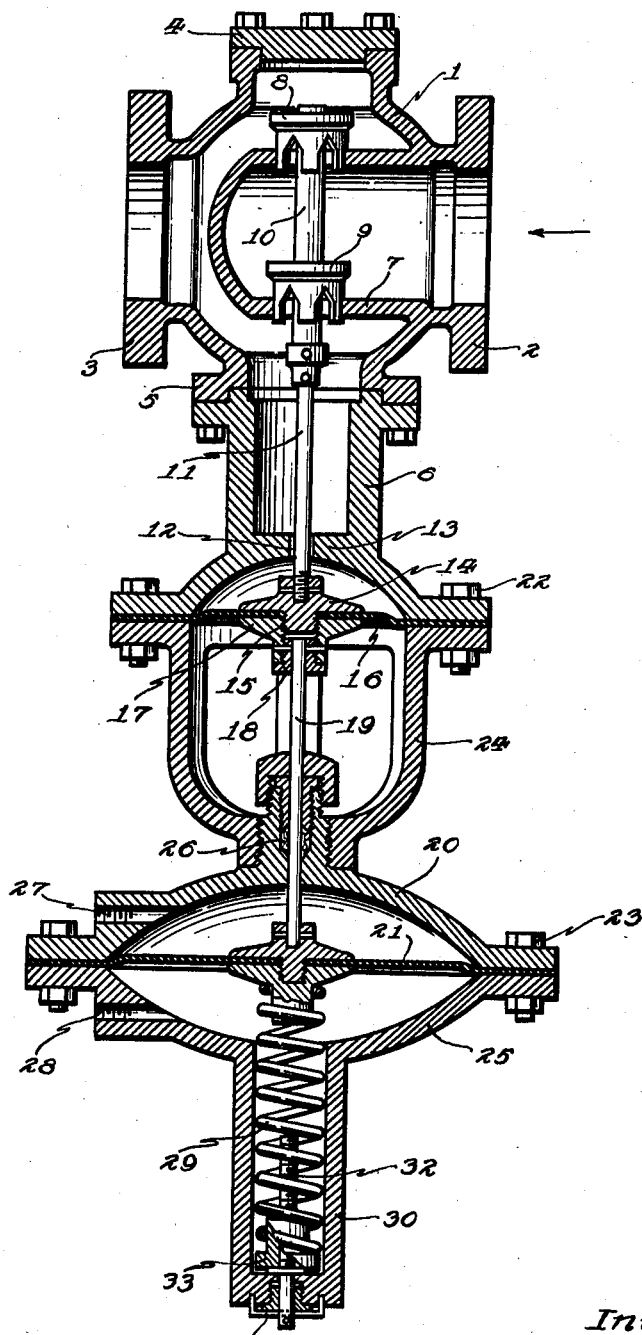

2,162,779

UNITED STATES PATENT OFFICE 2,162,779

PRESSURE REGULATOR

Richard W. Leutwiler, Chicago, and William Eichholz, Cicero, Ill., assignors to The Illinois Engineering Company, Chicago, Ill., a corporation of Illinois Application April 27, 1936, Serial No. 76,622

2 Claims. (Cl. 137—153)

This invention relates to fluid actuated pressure regulators of the diaphragm motor type.

The purposes of the invention are to make a pressure regulating valve actuating means suitable for a wide range of uses such as controlling flow through the valve according to the pressure on the outlet side of the valve or according to the difference in pressure between the inlet and outlet sides of the valve or according to any desired variable differences in pressures between the inlet and outlet sides of the valve, or to control the flow through the valve according to the action of thermostatic or manually operated control means.

The purposes of the invention are attained by means of the construction as illustrated in the drawing, which is a vertical sectional view of the diaphragm motor actuated valve construction arranged to be influenced in its action by the pressure of the fluid passing through the valve and by separate fluid pressures admitted to one of the actuating diaphragm motors for the valve.

The construction as illustrated consists of a valve body preferably provided with a balanced double seating valve and having attached to its stem a plurality of valve actuating diaphragms which are arranged to be subject to different pressures on opposite sides thereof and are connected with adjustable spring restoring means.

The pressures applied to the diaphragms are for one of the diaphragms, the pressure of the controlled fluid on the low pressure side of the valve at one face of the diaphragm and atmospheric pressure at the opposite face of the diaphragm. The other diaphragm motor for controlling the action of the valve is arranged so that its diaphragm will be subject on one side to fluid pressure of any desired value above atmosphere, and on the other side to a vacuum or fluid pressure below atmospheric pressure.

The construction is responsive to fluid pressures of any kind but is designed particularly for operation by compressible and elastic fluids, such as steam or air, and is intended for use mainly in controlling steam circuits in steam heating systems.

The different items of construction used in the regulator are separately standard articles but are associated in a manner to widen the general utility of regulating valves for positively controlling the flow of the steam according to any desired pressure differentials, constant or variable.

The valve body 1 is of the globe type provided with flanges 2 and 3 for attachment to inlet and outlet steam mains. The valve body is closed at its top by the cap 4 and is open at its bottom where it has the surrounding flange 5 to which is attached housing 6 for a diaphragm motor.

The dividing wall construction 7 of the valve body is apertured to receive and seat the valves 8 and 9 carried by the connecting stem 10. Pinned to the lower end of valve stem 10 is a rod 11 which extends downwardly through an opening 12 of larger diameter than rod 11 in web 13 of housing 6. The lower end of rod 11 is pinned to a diaphragm clamping member 14 which has a central threaded boss 15 extending through a diaphragm 16 and for receiving a diaphragm clamping nut 17. The nut 17 also receives a threaded plug 18 to which is pinned rod 19 which extends downwardly into the upper half of a housing 20 enclosing a diaphragm 21. Both diaphragms are clamped at their peripheries by bolts 22 and 23 respectively between housing 6 and spider 24 and the housing formed by the parts 20 and 25. The upper diaphragm 16 is subject to the pressure in the main conduit on the low pressure side of the valve body on its upper surface and on its lower surface is subject to atmospheric pressure.

The lower diaphragm 21 is sealed against atmospheric pressure, the packing 26 being provided where the rod 19 passes through housing member 20. A variable air pressure is admitted to the upper surface of diaphragm 21 through a fitting attached to a threaded boss 27 in housing member 20 and the lower surface of diaphragm 21 is subject to a different variable lower air pressure or vacuum through a fitting attached to threaded boss 28 in the lower element 25 of the diaphragm housing.

Diaphragm 21 is also subject to the action of a spring 29 contained within a spring housing 30 formed integral with the housing member 25 and closed at its lower end by gland plug 31. This plug supports a threaded post 32 which may be rotated to change the compression of spring 29 through the spring seat 33 which has threaded engagement with the post.

In the operation of the construction a wide range of variations is possible to meet the requirements of any particular circuit wherein flow is to be regulated to maintain any predetermined pressure condition on the low pressure side of the valve with reference to whatever higher pressure is available on the high pressure side of the valve. To accomplish this purpose it is necessary to use a plurality of diaphragm motors acting upon the valve stem and supplemented by the effects of an adjustable spring and atmospheric pressure. Any fluid pressures may be used for acting on the lowermost diaphragm 21. A positive pressure on one side of the diaphragm may be opposed by a negative pressure on the opposite side thereof. One of the pressures is opposed or supplemented by the action of spring 29, which is tensioned as desired by means of a screw passing through a packing at the lower end of the construction. The upper diaphragm 16 acts in opposition or with diaphragm 21, according to the pressures on its opposite faces, one of which is atmospheric and the other is the pressure of the fluid passing through the valve body.

In case the construction is used to regulate a steam heating system the steam pressure is communicated from the low pressure side of the valve through the opening 12 to the upper surface of diaphragm 16, which is protected from the steam temperature by condensate. This diaphragm accordingly tends to urge the valves toward their closed or open positions according to whether the steam pressure is above or below the atmospheric pressure on the lower side of the diaphragm.

The action of the valves is further influenced to maintain any constant or variable differential between the high and low pressure sides of the valves or to positively hold the valves wide open or fully seated, according to the three factors of the spring and opposed pressures on opposite sides of the diaphragm 21. In some cases liquid pressures are admitted to the lower diaphragm motor through the openings 27 or 28 or compressible gases are used for this purpose when it is desired to maintain a negative pressure either constant or variable upon one side of the diaphragm.

The instrument is particularly useful for the purpose of maintaining or varying the temperature conditions of a steam heating system by means of a single regulator, or a plurality of regulators, when the temperatures maintained in different zones of the heating system are different. The action of the valves is automatic according to the pressure of the steam controlled thereby as varied by the fluid pressures admitted to the lower diaphragm motor, either through thermostatically controlled valves or independently thereof. To positively open or close the valves 8 and 9 by manually operated means fluid under the required pressure is admitted through either of the ports 27 or 28.

We claim:

1. An automatic pressure regulator of the class described comprising a valve body provided with a seat and guide for a valve, a valve mounted within said body and having a stem passing through said body, a plurality of diaphragm motors attached to the valve body and having diaphragms connected with the valve stem, means for admitting fluid pressure from the low pressure side of said valve body to one face of one of the diaphragms and means for admitting atmospheric pressure to the opposite side thereof, a gas tight housing for another of said diaphragms, and means for admitting different fluid pressures in said housing on opposite sides of the diaphragm.

2. An automatic pressure regulator of the class described comprising a valve body provided with a seat and guide for a valve, a valve mounted within said body and having a stem passing through said body, a plurality of diaphragm motors attached to the valve body and having diaphragms connected with the valve stem, means for admitting fluid pressure from the low pressure side of said valve body to one face of one of the diaphragms, and means for admitting atmospheric pressure to the opposite side thereof, a gas tight housing for another of said diaphragms, means for admitting different fluid pressures in said housing on opposite sides of the diaphragm, and adjustable spring means for supplementing the pressure exerted upon one side of said last mentioned diaphragm.

RICHARD W. LEUTWILER.
WILLIAM EICHHOLZ.